United States Patent
Krishna et al.

(10) Patent No.: US 12,273,257 B2
(45) Date of Patent: Apr. 8, 2025

(54) ROUTING NETWORK TRAFFIC FOR HOSTS AND CONTAINERS WITH REDUNDANT NETWORK INTERFACES

(71) Applicant: Dell Products L.P., Round Rock, TX (US)

(72) Inventors: Vimal Krishna, Bengaluru (IN); Sridharan Kuppuswamy, Bangalore (IN)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 18/159,133

(22) Filed: Jan. 25, 2023

(65) Prior Publication Data

US 2024/0250892 A1 Jul. 25, 2024

(51) Int. Cl.
*H04L 45/02* (2022.01)
*H04L 45/745* (2022.01)
*H04L 61/256* (2022.01)
*H04L 101/677* (2022.01)

(52) U.S. Cl.
CPC ............ *H04L 45/02* (2013.01); *H04L 45/745* (2013.01); *H04L 61/256* (2013.01); *H04L 2101/677* (2022.05)

(58) Field of Classification Search
CPC .......... H04L 45/00; H04L 45/76; H04L 45/02; H04L 45/745; H04L 61/256
See application file for complete search history.

(56) References Cited

U.S. PATENT DOCUMENTS

| | | | |
|---|---|---|---|
| 11,392,422 B1* | 7/2022 | Filiz | G06F 9/45558 |
| 2018/0287883 A1* | 10/2018 | Joshi | H04L 67/34 |
| 2019/0312811 A1* | 10/2019 | Pfister | H04L 47/34 |
| 2020/0067763 A1* | 2/2020 | Vytla | H04L 41/0806 |
| 2020/0218798 A1* | 7/2020 | Kosaka | G06F 9/455 |
| 2021/0325954 A1* | 10/2021 | Guim Bernat | G06F 1/3228 |
| 2023/0079209 A1* | 3/2023 | Nallamothu | H04L 45/745 |

* cited by examiner

*Primary Examiner* — Nam T Tran
(74) *Attorney, Agent, or Firm* — DALY, CROWLEY, MOFFORD & DURKEE, LLP

(57) ABSTRACT

According to one aspect of the disclosure, a method includes: determining a plurality of network addresses assigned to an application, the application being deployed within a container on a host; determining a plurality of network addresses assigned to the container; and configuring networking of the host and of the container to establish routes between at least a first one of the plurality of network addresses assigned to the application and at least a first one of the plurality of network addresses assigned to the container.

14 Claims, 6 Drawing Sheets

ROUTING NETWORK TRAFFIC FOR HOSTS AND CONTAINERS WITH REDUNDANT NETWORK INTERFACES

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

Computer applications, including storage management applications, may be hosted on one or more physical and/or virtual machines (VMs) within a cloud computing environment and/or an on-premises data center. Client devices (sometimes referred to a user devices) can access hosted applications over one or more computer networks, including local area network (LAN) and wide area network (WAN) networks.

Containerized applications run in isolated runtime environments called containers. Container technologies such as DOCKER, KUBERNETES, and Linux containers (LXC) are increasingly popular with enterprises, as they provide application isolation and ease of deployment.

SUMMARY

According to one aspect of the disclosure, a method includes: determining a plurality of network addresses assigned to an application, the application being deployed within a container on a host; determining a plurality of network addresses assigned to the container; and configuring networking of the host and of the container to establish routes between at least a first one of the plurality of network addresses assigned to the application and at least a first one of the plurality of network addresses assigned to the container.

In some embodiments, the determining of the plurality of network addresses assigned to an application can include obtain the network addresses from a network address translation (NAT) table. In some embodiments, the configuring of the networking of the host and of the container may include configuring: a route between a first one of the plurality of network addresses assigned to the application and a first one of the plurality of network addresses assigned to the container; and a route between a second one of the plurality of network addresses assigned to the application and a second one of the plurality of network addresses assigned to the container. In some embodiments, the application may be deployed within another container running on another host, and the method can further include: configuring networking of the another host and of the another container to route between at least a second one of the plurality of network addresses assigned to the application and a network address assigned to the another container.

In some embodiments, the networking of the container may be initially managed by a container service, wherein the configuring of the networking of the host and of the container can include: disabling management of the networking of the container by the container service; generate a plurality of networks for use by the container; and configuring the plurality of networks for use by the container to route incoming and outgoing traffic. In some embodiments, the configuring of the networking of the host and of the container can include configuring one or more incoming routes from the host to the container and configuration one or more outgoing routes from the container to the host. In some embodiments, the host may have a plurality of redundant network interfaces, wherein each of the plurality of network addresses assigned to the container is associated with a respective one of the plurality of redundant network interfaces.

According to another aspect of the disclosure, an apparatus includes a processor and a non-volatile memory storing computer program code that when executed on the processor causes the processor to execute a process. The process can correspond to any of the aforementioned method embodiments.

According to another aspect of the disclosure, a non-transitory machine-readable medium encodes instructions that when executed by one or more processors cause a process to be carried out. The process can correspond to any of the aforementioned method embodiments.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

BRIEF DESCRIPTION OF THE DRAWINGS

The manner of making and using the disclosed subject matter may be appreciated by reference to the detailed description in connection with the drawings, in which like reference numerals identify like elements.

Figure 1:
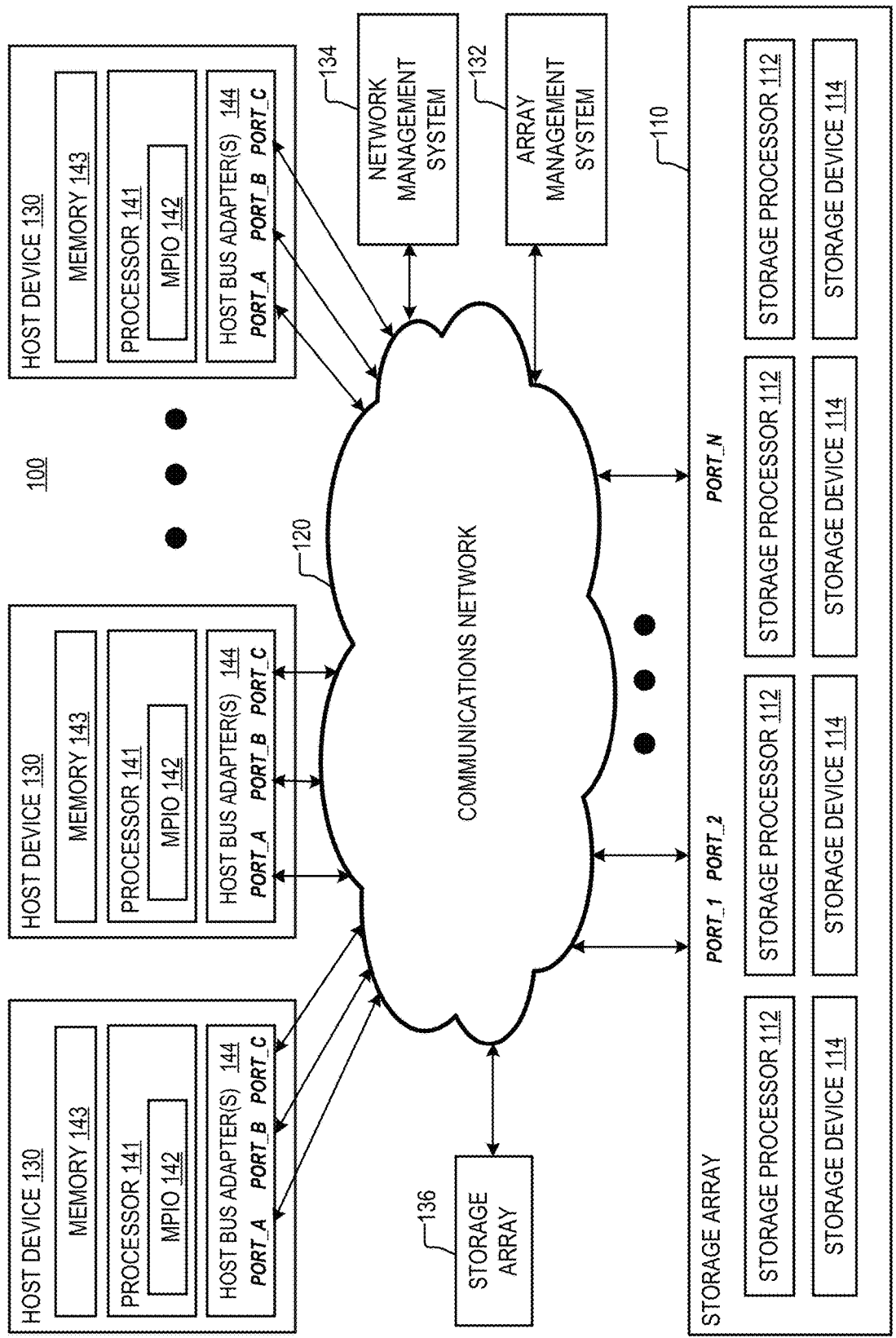
FIG. 1 is a block diagram of an illustrative storage system within which embodiments of the present disclosure may be utilized.

The drawings are not necessarily to scale, or inclusive of all elements of a system, emphasis instead generally being placed upon illustrating the concepts, structures, and techniques sought to be protected herein.

DETAILED DESCRIPTION

To provide high-availability, host machines (e.g., hosts that provide storage-related services) can be configured to have multiple, redundant network interface controllers (NICs). Different NICs may be assigned different internal/private Internet Protocol (IP) addresses on the same subnet.

Client devices can access the host, and applications running thereon, via a gateway device that is assigned or otherwise associated with an external/public IP address. A gateway can route traffic between a client and a host over a particular one of the host's redundant NICs, while mapping between the gateway's external IP address and the NIC's internal IP address using network address translation (NAT). In some cases, multiple, redundant gateways may be used, with different gateways configured to route traffic to different host NIC's. In the case of a distributed computing system (e.g., a distributed storage system), there may be multiple hosts each having redundant NICs. Here, each of NICs may be assigned a unique internal IP address such that a gateway can route to a particular NIC of a particular host.

To provide redundancy at the application-level, multiple instances of an application may be run across one more physical/virtual host machines. Additionally or alternatively, a single instance of an application may bind to multiple network interfaces on a single host. Various high-availability models (or "topologies") may be used at the application level. According to an "active-standby" model, a single instance of an application may be deployed, with that instance configured tor receive network traffic from two or more network interfaces at a given time. In contrast, with an "active-active" model, multiple instances of an application may be deployed on multiple hosts, and each instance can receive network traffic concurrently from a single interface on its host.

IP routing tables on the host OS (in the case of a physical host) or guest OS (in the case of a virtual host) can be configured to control, in part, which high-availability model is in effect for a given application. However, containerized applications present a special challenge in this regard. In particular, while containerization platforms may allow multiple networks to be created and individual containers to be connected to multiple such networks, they may not provide the ability to control routing for those networks. For example, DOCKER manipulates the host's packet handling rules (known as "iptables" rules on Linux) to isolate its networks, thereby preventing control over routing. Thus, using existing technology, it may not be possible to route traffic from a particular host NIC to a particular container network interface, thus preventing the use of certain high-availability models.

Described herein are structures and techniques for enabling the use of high-availability models-including active-standby and active-active—with containerized applications. The described structures and techniques can be applied to any computer system that makes use of containerized applications, ranging from standalone server devices to large-scale cloud computing services.

FIG. 1 is a diagram of an example of a storage system 100 within which embodiments of the present disclosure may be utilized. As illustrated, the system 100 may include a storage array 110, a communications network 120, a plurality of host devices 130, an array management system 132, a network management system 134, and a storage array 136.

The storage array 110 may include a plurality of storage processors 112 and a plurality of storage devices 114. Each of the storage processors 112 may include a computing device that is configured to receive I/O requests from any of the host devices 130 and execute the received I/O requests by reading or writing data to the storage devices 114. In some implementations, each of the storage processors 112 may have an architecture that is the same or similar to the architecture of the computing device 600 of FIG. 6. The storage processors 112 may be located in the same geographic location or in different geographic locations. Similarly, the storage devices 114 may be located in the same geographic location or different geographic locations. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, the storage devices 114 may be arranged in one or more Redundant Array(s) of Independent Disks (RAID) arrays. The communications network 120 may include one or more of the Internet, a local area network (LAN), a wide area network (WAN), a fibre channel (FC) network, and/or any other suitable type of network.

Each of the host devices 130 may include a laptop, a desktop computer, a smartphone, a tablet, an Internet-of-Things device, and/or any other suitable type of electronic device that is configured to retrieve and store data in the storage arrays 110 and 136. Each host device 130 may include a memory 143, a processor 141, and one or more host bus adapters (HBAs) 144. The memory 143 may include any suitable type of volatile and/or non-volatile memory, such as a solid-state drive (SSD), a hard disk (HD), a random-access memory (RAM), a Synchronous Dynamic Random-Access Memory (SDRAM), etc. The processor 141 may include any suitable type of processing circuitry, such as a general-purpose process (e.g., an x86 processor, a MIPS processor, an ARM processor, etc.), a special-purpose processor, an application-specific integrated circuit (ASIC), a field programmable gate array (FPGA), etc. Each of the HBAs 144 may be a circuit board or integrated circuit adapter that connects a respective one of the host devices 130 to the storage array 110 (and/or storage array 136). In other words, each of the HBAs 144 may include a communications interface for connecting to the communications network 120, storage array 110 and/or storage array 136. Although in the example of FIG. 1 each of the host devices 130 is provided with at least one HBA 144, alternative implementations are possible in which the each of the host devices is provided with another type of communications interface, in addition to (or instead of) an HBA. The other type of communications interface may include one or more of an Ethernet adapter, an WiFi adapter, a local area network (LAN) adapter, etc.

Each processor 141 may be configured to execute a multi-path I/O (MPIO) driver 142. The MPIO driver 142 may comprise, for example, PowerPath TM drivers from Dell EMC TM, and/or other types of MPIO drivers that are arranged to discover available communications paths any of the host devices 130 and the storage array 110. The MPIO driver 142 may be configured to select I/O operations from any of the I/O queues of the host devices 130. The sources of the I/O operations stored in the I/O queues may include respective processes of one or more applications executing on the host devices 130.

The HBA 144 of each of the host devices 130 may include one or more ports. Specifically, in the example of FIG. 1, the HBA 144 of each of the host devices 130 includes three ports, which are herein enumerated as "port A", "port B", and "port C". Furthermore, the storage array 110 may also include a plurality of ports. In the example of FIG. 1, the ports in the storage array 110 are enumerated as "port 1", "port 2," and "port N", where N is a positive integer greater than 2. Each of the ports in the host devices 130 may be coupled to one of the ports of the storage array via a corresponding network path. The corresponding network path may include one or more hops in the communications network 120. Under the nomenclature of the present disclosure, a network path spanning between an HBA port of one of host devices 130 and one of the ports of the storage array 110 is referred to as a "network path of that host device 130".

Figure 6:
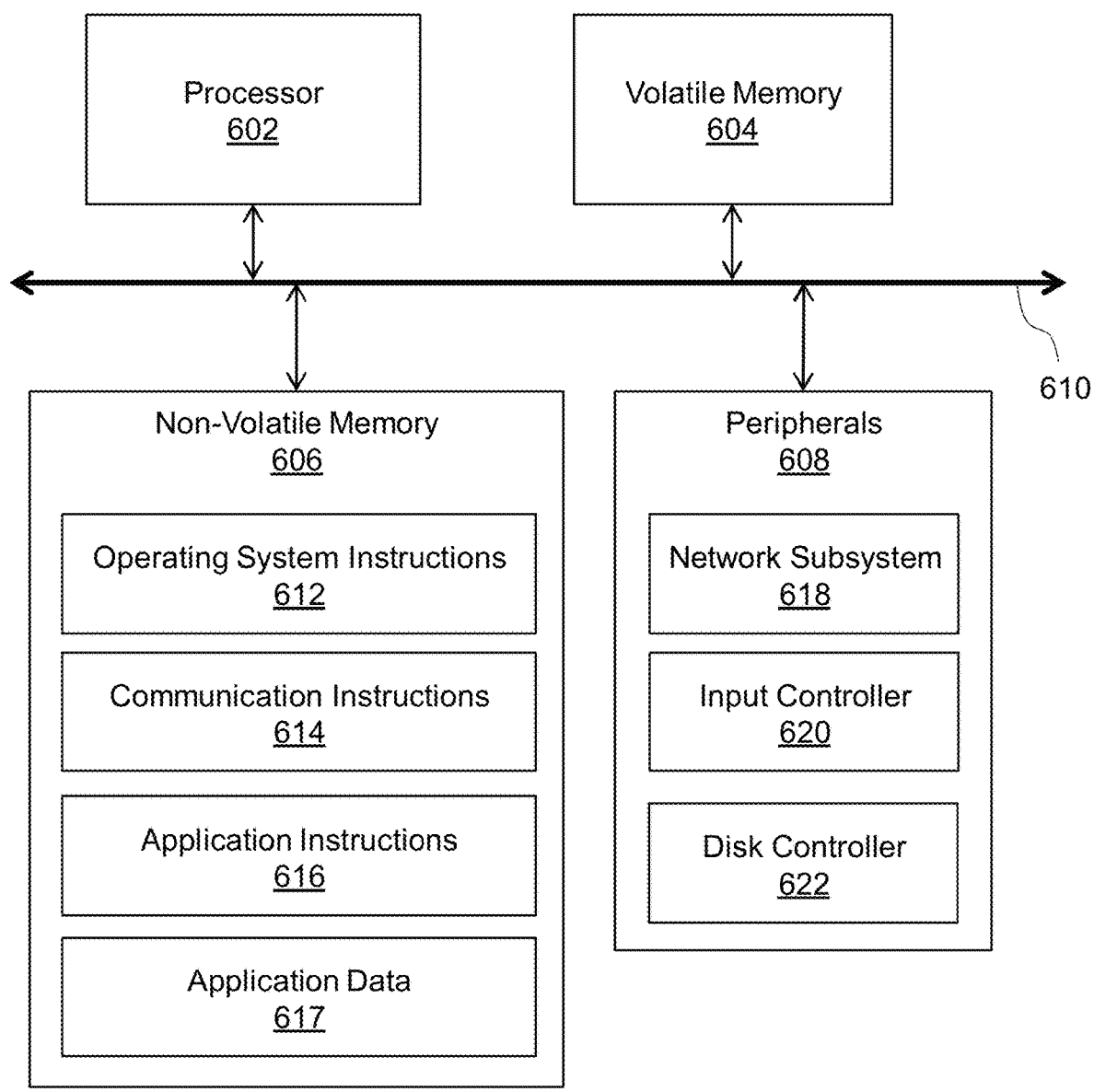
FIG. 6 is block diagram of a processing device on which methods and processes disclosed herein can be implemented, according to some embodiments of the disclosure.

Array management system 132 may include a computing device, such as the computing device 600 of FIG. 6. The array management system 132 may be used by a system administrator to re-configure the storage array 110, e.g., when degraded performance of the storage array 110 is detected.

Network management system 134 may include a computing device, such as the computing device 600 of FIG. 6. The network management system 134 may be used by a network administrator to configure the communications network 120 when degraded performance of the communications network 120 is detected.

The storage array 136 may be the same or similar to the storage array 110. The storage array 136 may be configured to store the same data as the storage array 110. The storage array 136 may be configured to operate in either active-active configuration with the storage array 110 or in active-passive configuration. When storage arrays 110 and 136 operate in active-active configuration, a write request to either of storage arrays 110 and 136 is not acknowledged back to the sender until the data associated with the write request is written to both of the storage arrays 110 and 136. When storage arrays 110 and 136 are operated in active-passive configuration, a write request to a given one of the storage arrays 110 and 136 is acknowledge for as long the data associated with write request is written to the given one of the storage arrays 110 and 136 before the writing to the other one of the storage arrays is completed.

Figure 2:
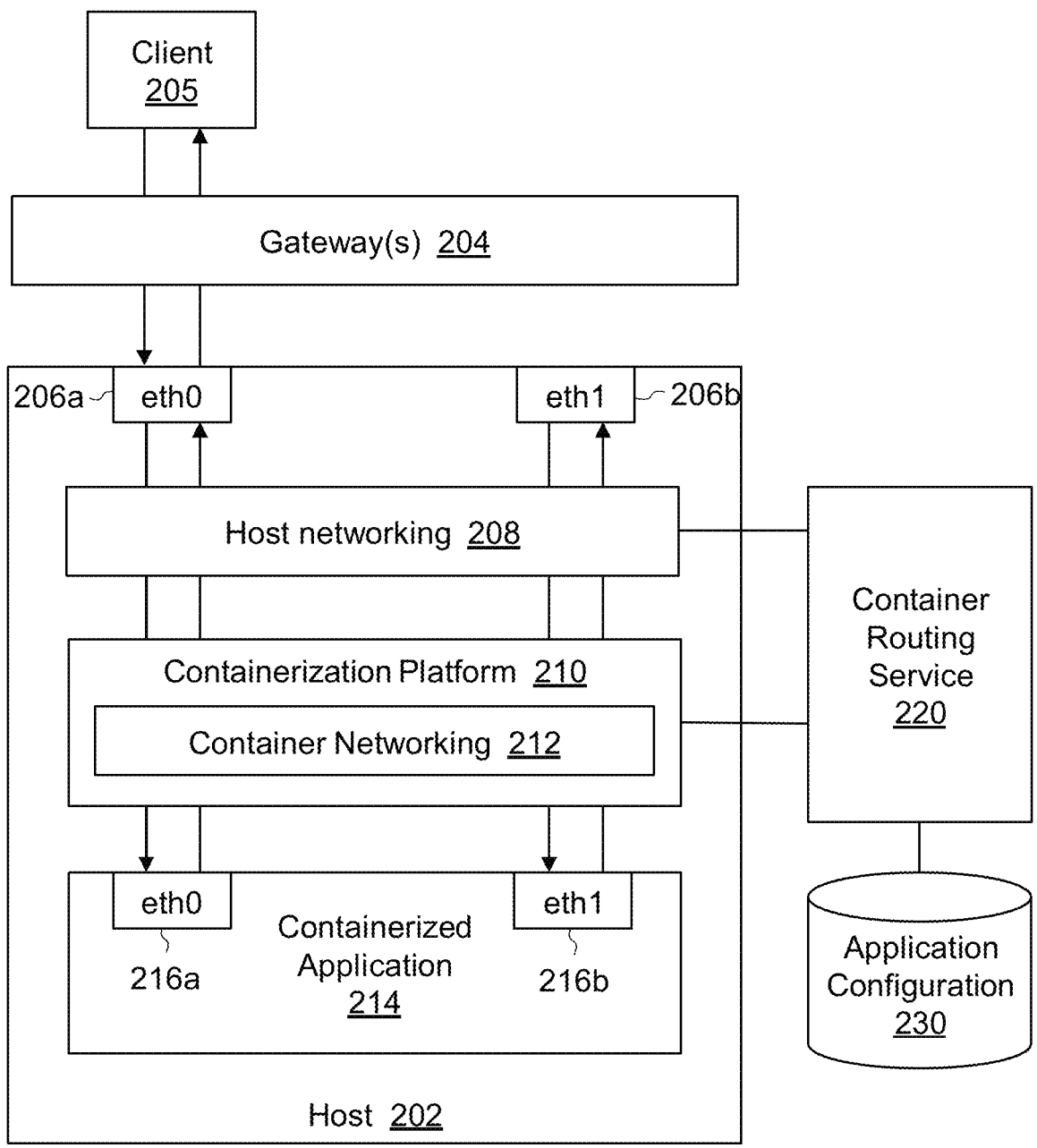
FIG. 2 is a block diagram of an illustrative computing environment in which redundant network interfaces can be used to route network traffic to containerized applications, according to some embodiments.

FIG. 2 shows an example of a computing environment 200 in which redundant network interfaces can be used to route network traffic to a containerized application, according to some embodiments. In this simplified example, a single host 202 is shown as being accessed by a client device 205 via one or more gateways 204. More generally, the structures and techniques disclosed herein can be applied to environments and systems having an arbitrary number of host machines.

As shown, host 202, which may correspond to a physical or virtual machine, has two redundant network interfaces 206a, 206b and host network functions 208 which may be provided by a host OS (in the case of a physical machine) or guest OS (in the case of a virtual machine). Host networking functions 208 can include, for example, functions/commands for configuring packet handling rules and functions for configuring packet routing within the host 202. In the case of a Linux-based OS, host network functions 208 can include, for example, the "iptables" and "ip rules" commands and associated system calls.

Host 202 has installed on it a containerization platform 210 (e.g., DOCKER) which can include its own networking functions 212 (or "subsystem"). The container networking functions 212 can include functions/commands for creating a network and attaching a container to a specific docker network. For example, in the case of DOCKER, the following commands may be included and utilized for these respective purposes:

docker network create [OPTIONS] NETWORK
docker network connect [OPTIONS] NETWORK CONTAINER Of note, DOCKER'S default routing settings send all traffic through a single DOCKER network irrespective of how many networks are attached to the container.

Containerization platform allows 210 one or more containers to be deployed and executed on host 202, with each container corresponding to a standard unit of software that packages up code and all its dependencies. In some cases, a container may correspond a single application (along with any dependencies that application may have). In the example of FIG. 2, a single application container 214 is shown as being deployed by containerization platform allows 210. In practice, many different containerized applications can be deployed on a single host.

As previously discussed, application-level redundancy may be achieved by, for example, having a single instance of an application bind to two different network interfaces ("active-passive" with failover to another host) or having multiple instances of an application run on multiple different hosts ("active-active"). To support these high-availability modes with containerized applications, it may be necessary to configure multiple network interfaces within application container 214 and also to establish routes between the host-level interfaces and the container-level interfaces. While existing containerization platforms may allow multiple networks to be created and individual containers to be connected to multiple such networks (e.g., using container networking functions 212), they may not provide the ability to control routing for those networks. For example, DOCKER manipulates the host's packet handling rules (e.g., iptables rules) to isolate its networks, thereby preventing control over routing.

Figure 3:
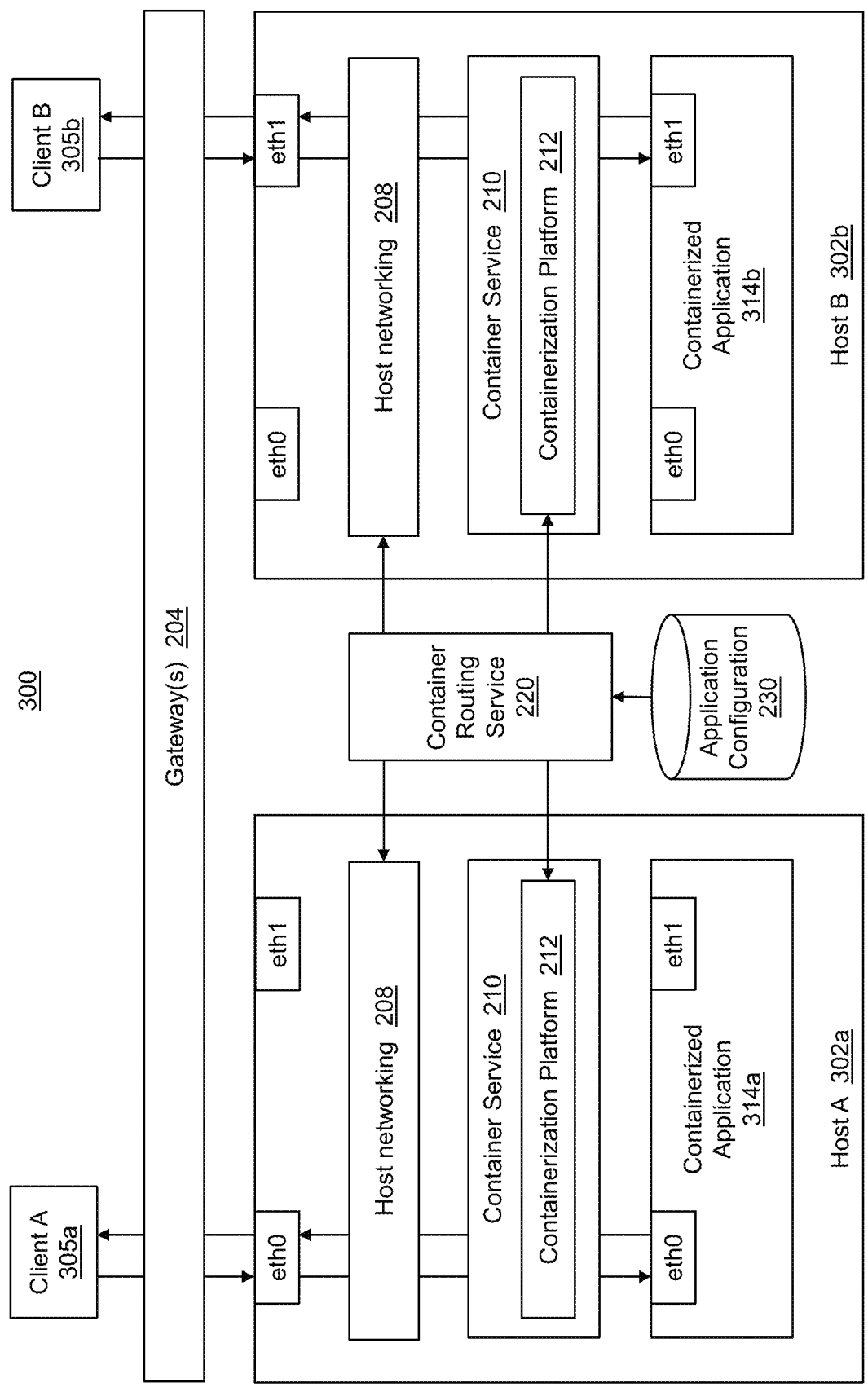
FIG. 3 is a block diagram of another illustrative computing environment in which redundant network interfaces can be used to route network traffic to containerized applications, according to some embodiments.

To overcome this challenge and improve upon existing solutions, a container routing service 220 may be provided, according to some embodiments. Service 220 may be deployed and run on host 202 or as an external service (e.g., on a separate node in the computing environment 200). In some cases, service 220 may be comprise of two parts: an agent (not shown) that runs on individual hosts (e.g., host 202) and an external service that interfaces therewith. In some cases, a single container routing service 220 may interface with many hosts, such as illustrated in FIG. 3. In any case, service 220 may be configured to interface with (e.g., call) host networking functions 208 and containerization platform 210, as shown.

The general operation of single container routing service 220 is now described.

First, service 220 can identify one or more containerized applications that are deployed on, or otherwise associated with, host 202. In some embodiments, service 220 can receive one or more application names as input (e.g., via a command-line interface, CLI, or application programming interview, API). In some embodiments, service 220 can query an application configuration database 230 for a list of containerized applications associated with host 202. Various other methods can be used to identify the containerized application(s).

Next, service 220 can disable the containerization platform's 210 control over the host's packet handling rules (e.g., iptables rules). For example, in the case of DOCKER, the "iptables" key may be set to false in the DOCKER daemon configuration (e.g., the configuration file located at "/etc/docker/daemon.json"), and then DOCKER daemon may be restarted.

Next, one or more networks may be created within the containerization platform 210, if not already created, using container networking functions 212. For example, one such network may be created per host network interface 206 using command similar to as the following:

```
docker network create --attachable --subnet=147.178.42.176/28 --
subnet=fd00:0001:0002:0003::2ab0/124 --ipv6 -o
com.docker.network.bridge.name=docker1A -o
com.docker.network.driver.mtu=1400 docker1A
docker network create --attachable --subnet=147.178.43.176/28 --
subnet=fd00:0001:0002:0003::2bb0/124 --ipv6 -o
com.docker.network.bridge.name=docker2A -o
com.docker.network.driver.mtu=1400 docker2A
```

Figure 4:
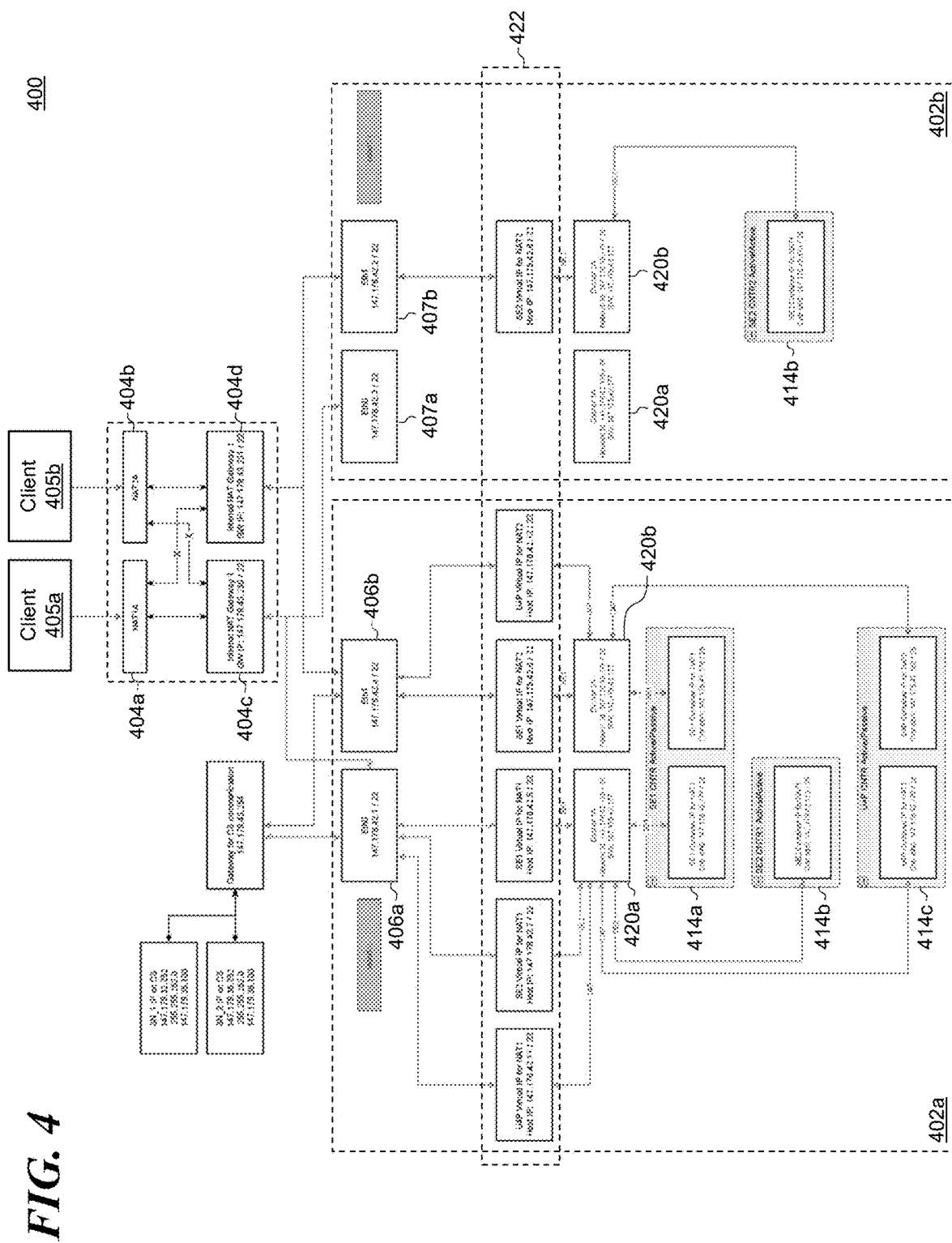
FIG. 4 is a schematic diagram of another illustrative computing environment in which redundant network interfaces can be used to route network traffic to containerized applications, according to some embodiments.

Thus, in the example of FIG. 2, two separate networks may be created within the containerization platform 210, one for each of the two network interfaces 206a, 206b. The networks may be created with separate LAN segments, such as illustrated in FIG. 4. In subsequent examples, it is assumed that two networks named "docker1A" and "docker2A" are created within containerization platform 210. Once these networks are created, containers deployed into the containerization platform 210 may have one or more network interfaces available to them, one for each network. For example, as shown FIG. 2, application container 214 can have two network interfaces 216a, 216b, one for each of the two networks "docker1A" and "docker2A."

Next, for each application, service 220 can determine one or more internal IP addresses assigned to the application on the host 202. An application may be assigned one or more internal IP addresses on the host and, in some cases, one internal IP address per host network interface 206. For convenience these are referred to herein as "virtual IP addresses." Thus, in the example of FIG. 2, an application may be assigned two virtual IP addresses, one for each of the two network interfaces 206a, 206b. In some cases, where environment 200 includes multiple gateways 204, each application may be assigned one virtual IP address per gateway. A mapping between application names and virtual IP addresses may be stored in a NAT table on the host 202 or external thereto. In some embodiments, the virtual IP address mappings may be stored in a database, such as within application configuration database 230. The virtual IP addresses may be IPv4 addresses, IPV6 addresses, or some combination thereof.

Next, for each application, service 220 can determine one or more IP addresses assigned to the application container within the containerization platform 210. For convenience these are referred to herein as "container IP addresses." In some embodiments, service 220 can read this information from a configuration file includes a mapping between application names and container IP addresses. Following is an example of such a configuration file that may be read and parsed to determine the container IP addresses for containerized application:

```
{
"container_ips": {
    "APP-1": {
        "docker1A": {"ipv4": "147.178.42.178", "ipv6":
"fd00:0001:00002:0003:2ab2"},
        "docker1B": {"ipv4": "147.178.43.178", "ipv6":
"fd00:0001:00002:0003:2Bb2"},
    },
    "APP-2": {
        "docker1A": {"ipv4": "147.178.42.179", "ipv6":
"fd00:0001:00002:0003:2ab3"},
        "docker1B": {"ipv4": "147.178.43.179", "ipv6":
"fd00:0001:00002:0003:2Bb3"},
    },
    ...
}
```

Next, for each application, service 220 can generate routing rules between the application's virtual IP addresses and container IP addresses using host networking functions 208. Rules may be created to route both incoming traffic (i.e., traffic sent from client 205 to containerized application 214) and outgoing traffic (i.e., traffic sent by containerized application 214 to client 205 or elsewhere).

The creation of the incoming routing rules may vary depending on which high-availability model is used for an application. In some cases, service 220 can determine the high-availability model for an application from a configuration file that is included in a package file for the application. Such a package file can include various configuration files along with the application image file (e.g., DOCKER image).

In the case of an active-standby application, service 220 may create multiple incoming routing rules on host 202 (assuming that host 202 is the current, active host for that application). In more detail, service 220 may create one rule for each of the application's virtual IP address, routing that virtual IP address to a corresponding container IP address assigned the application. For example, assume an application is assigned two virtual IP addresses on host 202—"NAT1A Internal IP" and "NAT2A Internal IP"—and that it has two container IP addresses—"IP1 on docker1A" and "IP2 on docker1A" (where "docker1A" and "docker2A" refer to networks previously created within containerization platform 210)—then service 220 may create the following two routing rules:

1. NAT1A Internal IP<->IP1 on docker1A
2. NAT2A Internal IP<->IP2 on docker2A

In the case of an active-standby application, service 220 may create one incoming routing rule on each host where the application is running. This technique is illustrated and discussed further below in the context of FIGS. 3 and 4.

In some embodiments, the creation of an incoming routing rule for a containerized application may involve three sub-steps:
1. Enable forwarding and masquerading between the host's network and each of the containerization platform's networks (e.g., "dockerA" and "dockerB"). In the case where the host runs a Linux-based OS, the "iptables" command can be used for this purpose. For example:

```
iptables -t nat -A POSTROUTING -s 147.178.42.176/28 -j MASQUER-
ADE
-w 5
iptables -A FORWARD -o docker1A -m conntrack --ctstate
RELATED,ESTABLISHED -j ACCEPT -w 5
iptables -A FORWARD -i docker1A ! -o docker1A -j ACCEPT -w 5
iptables -A FORWARD -i docker1A -o docker1A -j ACCEPT -w 5
```

2. Forward traffic from an application-specific internal IP address to a container IP address on a specific containerization platform network, using prerouting. In the case where the host runs a Linux-based OS, the "iptables" command can be used to create routes. For example:

```
$ iptables -A PREROUTING ! -s 147.178.40.0/22 -d 147.178.42.27/32
-j DNAT --to-destination 147.178.42.179
``` where 147.178.42.27 is virtual IP address assigned to the application and 147.178.42.179 is a container IP address assigned to the application, in this particular example.

3. Modify source IP when packet leaves container network using postrouting. In the case where the host runs a Linux-based OS, the "iptables" command can be used. For example:

```
iptables -t nat -A POSTROUTING -s 147.178.42.179/32 -j SNAT --to-source 147.178.42.27 -w 5
```

Finally, for each application, service 220 may configure one or more outgoing routing rules on the host 202 such that traffic originating from the application's container over a specific one of its network interfaces is routed over a desired host interface 206 and, in some cases, over a desired gateway 204. Stated differently, the goal is to use the correct NIC and gateway for outbound traffic from each containerized application. For example, referring to the example of FIG. 2, service 220 may use host networking functions 208 to configure a first outgoing route from container network interface 216a to host network interface 206a, and a second outgoing route from container network interface 216b to host network interface 206b. In the case of a Linux-based OS, the "ip rules" command may be used. For example:

```
ip rule add from 147.178.42.176/28 lookup NAT1A
ip rule add from 147.178.43.176/28 lookup NAT2A
```

In this example, the NAT tables NAT1A and NAT2A may have default routes via respective host interfaces (e.g., "eth0" and "eth1").

As a result of the above procedure, containerized application 214 may be configured to receive and send network traffic (e.g., packets) over the intended host interfaces 206 and gateway(s) 204. Thus, disclosed commuter-implemented techniques allow for the various high-availability models to be used with containerized applications. For example, assuming that an active-passive model is used for containerized application 214 of FIG. 2, if host network interface 206a or an associated NAT gateway fails, client device 205 may still be able to access the containerized application over redundant interface 206b (e.g., using a different NAT gateway).

Turning to FIG. 3, in which like elements of FIG. 2 are identified using like reference numerals, an illustrative computing environment 300 includes two hosts 302a, 302b (302 generally) running containerized applications 314a, 314b (314 generally), respectively. Each host 320 has redundant network interfaces, "eth0" and "eth1," as shown.

Assume it is desired to have a given application run within computing environment 300 using an active-active high-availability model and as a containerized application. According to the present disclosure, container routing service 220 can, on each host 302, disable the containerization platform's 210 control over the host's packet handling rules and create one or more networks within the containerization platform 210, using previously described techniques. The application can then be deployed to both hosts 302a, 302b via containerization service 210, resulting in containerized applications 314a, 314b, which each have one or more network interfaces. In the example shown, each containerized applications 314a, 314b has two network interfaces, "eth0" and "eth1."

Service 220 can then establish incoming and outgoing routes between the host network interfaces and the container network interfaces using the general approach described above. In the case of active-active, service 220 can create a single incoming routing rule on each host 302 (in contrast to active-passive where it may create multiple rules on a single host). For example, again assuming the application is assigned two virtual IP addresses on host 202—"NAT1A Internal IP" and "NAT2A Internal IP"—and that it has two container IP addresses—"IP1 on docker1A" and "IP2 on docker1A" (where "docker1A" and "docker2A" refer to networks previously created within containerization platforms 210)—then service 220 may create the following two routing rules:

1. On first host 302a: NAT1A Internal IP<->IP1 on docker1A
2. On second host 302b: NAT2A Internal IP<->IP2 on docker2A In this way, two different clients 305a, 305b can access different instances of the same application deployed on two different hosts 302a, 302b, as shown in FIG. 3. In some embodiments, first client 305a may connect to first host 302a via a first NAT gateway and first client 305b may connect to first host 302b via a second NAT gateway.

Service 220 can create outgoing routing rules on each host 302b using the same approach described above in the context of FIG. 2.

FIG. 4 shows another example of a computing environment 400 in which embodiments of the present disclosure can be used to enable highly-available containerized applications. As shown, client devices 405a, 405b can access two hosts 402a, 402b via gateways 404a-d (404 generally). Here, the gateways 404 include two external gateways 404a, 404b ("NAT1A" and "NAT2A") and two internal gateways 404c, 404d ("Internal NAT Gateway 1" and "Internal NAT Gateway 2"). Having separate internal and external gateways can provide improved network isolation and control. Each host 402a, 402b has a pair of redundant network interfaces connected to different ones of the internal gateways 404c, 404d. In more detail, host 404a has a first network interface 406a connected to a first internal gateway 404c and a second network interface 406b connected to second internal gateway 404d, and host 404b has a first network interface 407a connected to first internal gateway 404c and second network interface 407b connected to second internal gateway 404d.

As shown, a first containerized application 414a ("SE1") may be deployed in an active-passive mode on host 402a, a containerized second application 414b ("SE2") may be deployed in an active-active mode on both hosts 402a, 402b, and a containerized third application 414c ("U4P") may be deployed in an active-passive mode also on host 402a. A container routing service (not shown) may perform steps previously described to establish routes between the host network interfaces and network interfaces of the containers in which applications 414a-c are deployed. For example, as shown, two networks 420a, 420b can be created within the containerization platform on each host 402a, 402b (e.g., within DOCKER). It can then create incoming and outgoing routes between the six (6) virtual IP addresses 422 assigned to each of the three containerized applications 414a-c, as shown. To allow for this, the containerization platform's control over host's packet handling rules may first be disabled.

Of note, on host 402a, routes are established between both host network interfaces 406a, 406b and active-passive application containers 414a, 414c. In contrast, for active-passive application 414b, routing is only established between the first network interface 406a.

Figure 5:
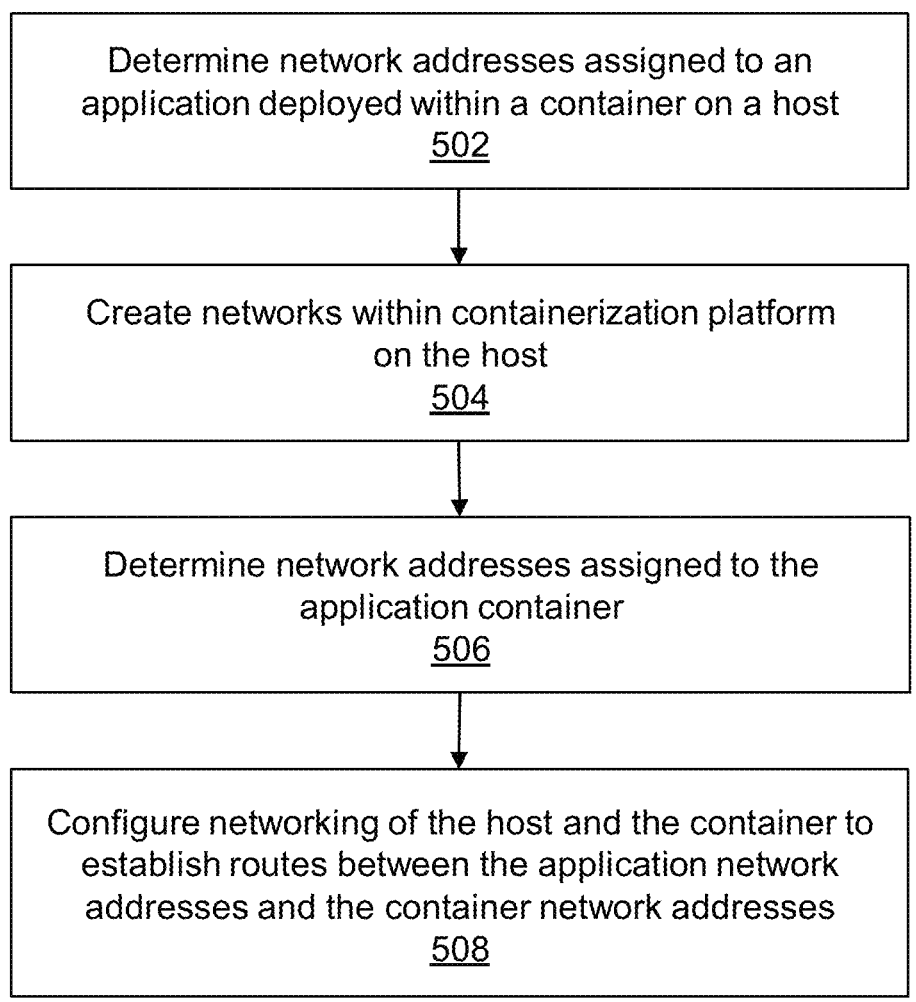
FIG. 5 is a flow diagram showing an illustrative process for configuring routes to containerized applications having redundant network interfaces, according to some embodiments.

FIG. 5 shows an example of a process 500 for configuring routes to containerized applications having redundant network interfaces, according to some embodiments. Illustrative process 500 may be implemented and executed by, for example container routing service 220 of FIGS. 2 and 3, or may be otherwise utilized in conjunction with any of the computing environments of FIGS. 2-4.

At block 502, a plurality of network addresses assigned to an application can be determined. The application may be deployed within a container on a host (e.g., using DOCKER, KUBERNETES, LXC, or other containerization platform). The host, which can be a physical or virtual machine, may have a plurality of redundant network interfaces or NICs. In some cases, the network addresses assigned to the application may be internal/virtual IP addresses, and there may be one such network address for each of the host network interfaces. In some embodiments, the network addresses may be determined using a network address translation (NAT) table maintained on the host and/or a NAT gateway.

At block 504, one or more networks may be created within the containerization platform on the host. For example, one such network may be created for each of the host's network interfaces.

At block 506, a plurality of network addresses assigned to the container can be determined. For example, this information may be read from an internal configuration file maintained by the containerization platform, the file including a mapping between application names and container IP addresses. The container may be assigned one network address (or "container IP address") for each of the networks created at block 504.

At block 508, networking of the host and of the container can be configured to establish routes between at least a first one of the plurality of network addresses assigned to the application and at least a first one of the plurality of network addresses assigned to the container. Both incoming and outgoing routes may be established. In some embodiments, block 508 can include using network functions provided by the host OS and networking functions provided by the containerization platform. In some cases, the containerization platform's (DOCKER'S) control over the host's packet handling rules may first be disabled before such routes are established. In some embodiments, the routes may be established according to a high-availability model associated with the containerized application, such as an active-active model vs. an active-passive model. Detailed, step-by-step procedures for establishing the routes is provided above in the context of FIGS. 2 and 3, and a least a portion of those procedures may be utilized here.

FIG. 6 shows an illustrative server device 600 that may implement various features and processes as described herein. The server device 600 may be implemented on any electronic device that runs software applications derived from compiled instructions, including without limitation personal computers, servers, smart phones, media players, electronic tablets, game consoles, email devices, etc. In some implementations, the server device 600 may include one or more processors 602, volatile memory 604, non-volatile memory 606, and one or more peripherals 608. These components may be interconnected by one or more computer buses 610.

Processor(s) 602 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 610 may be any known internal or external bus technology, including but not limited to ISA, EISA, PCI, PCI Express, NuBus, USB, Serial ATA or FireWire. Volatile memory 604 may include, for example, SDRAM. Processor 602 may receive instructions and data from a read-only memory or a random access memory or both. The essential elements of a computer may include a processor for executing instructions and one or more memories for storing instructions and data.

Non-volatile memory 606 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 606 may store various computer instructions including operating system instructions 612, communication instructions 614, application instructions 616, and application data 617. Operating system instructions 612 may include instructions for implementing an operating system (e.g., Mac OS®, Windows®, or Linux). The operating system may be multi-user, multiprocessing, multitasking, multithreading, real-time, and the like. Communication instructions 614 may include network communications instructions, for example, software for implementing communication protocols, such as TCP/IP, HTTP, Ethernet, telephony, etc.

Peripherals 608 may be included within the server device 600 or operatively coupled to communicate with the server device 600. Peripherals 608 may include, for example, network interfaces 618, input devices 620, and storage devices 622. Network interfaces may include for example an Ethernet or Wi-Fi adapter. Input devices 620 may be any known input device technology, including but not limited to a keyboard (including a virtual keyboard), mouse, trackball, and touch-sensitive pad or display. Storage devices 622 may include one or more mass storage devices for storing data files; such devices include magnetic disks, such as internal hard disks and removable disks; magneto-optical disks; and optical disks.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

The subject matter described herein can be implemented in digital electronic circuitry, or in computer software, firmware, or hardware, including the structural means disclosed herein and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this disclosure, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

References in the disclosure to "one embodiment," "an embodiment," "some embodiments," or variants of such phrases indicate that the embodiment(s) described can include a particular feature, structure, or characteristic, but every embodiment can include the particular feature, structure, or characteristic. Moreover, such phrases are not necessarily referring to the same embodiment(s). Further, when a particular feature, structure, or characteristic is described in connection knowledge of one skilled in the art to affect such feature, structure, or characteristic in connection with other embodiments whether or not explicitly described.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

All publications and references cited herein are expressly incorporated herein by reference in their entirety.

The ivention claimed is:
1. A method comprising:
   determining that a first application uses an active-standby high availability model;
   determining that the first application is deployed within at least a first container and a second container on a first host according to the active-standby high availability model;
   determining at least a first network address and a second network address assigned to the first application;
   determining at least a first network address assigned to the first container and a second network address assigned to the second container;
   determining that a second application uses an active-active high availability model;
   determining that the second application is deployed within at least a third container on the first host and a fourth container on a second host of the plurality of hosts according to the active-active high availability model;
   determining at least a third network address and a fourth network address assigned to the second application;
   determining at least a third network address assigned to the third container and a fourth network address assigned to the fourth container; and configuring networking of the first and second hosts and of the first, second, third, and fourth containers to establish routes at least between;
  the first network address assigned to the first application and the first network address assigned to the first container,
  the second network address assigned to the first application and the second network address assigned to the second container,
  the third network address assigned to the second application and the third network address assigned to the third container, and
  the fourth network address assigned to the second application and the fourth network address assigned to the fourth container.

2. The method of claim 1, wherein the determining of the at least the first and second network addresses assigned to an application includes obtaining the at least the first and second network addresses from a network address translation (NAT) table.

3. The method of claim 1, wherein the networking of the first and second containers is initially managed by a container service, wherein the configuring of the networking of the host and of the first and second containers includes:
  disabling management of the networking of the first and second containers by the container service;
  generating a plurality of networks for use by the first and second containers; and
  configuring the plurality of networks for use by the first and second containers to route incoming and outgoing traffic.

4. The method of claim 1, where the configuring of the networking of the host and of the first and second containers includes configuring one or more incoming routes from the host to the first and second containers and configuring one or more outgoing routes from the first and second containers to the host.

5. The method of claim 1, wherein the host has a plurality of redundant network interfaces, wherein the first network address assigned to the first container is associated with a first one of the plurality of redundant network interfaces and the second network address assigned to the second container is associated with a second one of the plurality of redundant network interfaces.

6. An apparatus comprising:
a processor; and
a non-volatile memory storing computer program code that when executed on the processor causes the processor to execute a process including:
  determining that a first application uses an active-standby high availability model;
  determining that the first application is deployed within at least a first container and a second container on a first host according to the active-standby high availability model;
  determining at least a first network address and a second network address assigned to the first application;
  determining at least a first network address assigned to the first container and a second network address assigned to the second container;
  determining that a second application uses an active-active high availability model;
  determining that the second application is deployed within at least a third container on the first host and a fourth container on a second host of the plurality of hosts according to the active-active high availability model;
  determining at least a third network address and a fourth network address assigned to the second application;
  determining at least a third network address assigned to the third container and a fourth network address assigned to the fourth container; and
  configuring networking of the first and second hosts and of the first, second, third, and fourth containers to establish routes at least between:
    the first network address assigned to the first application and the first network address assigned to the first container,
    the second network address assigned to the first application and the second network address assigned to the second container,
    the third network address assigned to the second application and the third network address assigned to the third container, and
    the fourth network address assigned to the second application and the fourth network address assigned to the fourth container.

7. The apparatus of claim 6, wherein the determining of the at least the first and second network addresses assigned to an application includes obtaining the at least the first and second network addresses from a network address translation (NAT) table.

8. The apparatus of claim 6, wherein the networking of the first and second containers is initially managed by a container service, wherein the configuring of the networking of the host and of the first and second containers includes:
  disabling management of the networking of the first and second containers by the container service;
  generate a plurality of networks for use by the first and second containers; and
  configuring the plurality of networks for use by the first and second containers to route incoming and outgoing traffic.

9. The apparatus of claim 6, where the configuring of the networking of the host and of the first and second containers includes configuring one or more incoming routes from the host to the first and second containers and configuration one or more outgoing routes from the first and second containers to the host.

10. The apparatus of claim 6, wherein the host has a plurality of redundant network interfaces, wherein the first network address assigned to the first container is associated with a first one of the plurality of redundant network interfaces and the second network address assigned to the second container is associated with a second one of the plurality of redundant network interfaces.

11. A non-transitory machine-readable medium encoding instructions that when executed by one or more processors cause a process to be carried out, the process comprising:
  determining that a first application uses an active-standby high availability model;
  determining that the first application is deployed within at least a first container and a second container on a first host according to the active-standby high availability model;
  determining a at least a first network address and a second network address assigned to the first application;
  determining at least a first network address assigned to the first container and a second network address assigned to the second container;

determining that a second application uses an active-active high availability model;

determining that the second application is deployed within at least a third container on the first host and a fourth container on a second host of the plurality of hosts according to the active-active high availability model;

determining at least a third network address and a fourth network address assigned to the second application;

determining at least a third network address assigned to the third container and a fourth network address assigned to the fourth container; and configuring networking of the first and second hosts and of the first, second, third, and fourth containers to establish routes at least between:

the first network address assigned to the first application and the first network address assigned to the first container, the second network address assigned to the first application and the second network address assigned to the second container, the third network address assigned to the second application and the third network address assigned to the third container, and the fourth network address assigned to the second application and the fourth network address assigned to the fourth container.

12. The non-transitory machine-readable medium of claim 11, wherein the determining of the at least the first and second network addresses assigned to an application includes obtaining the at least the first and second network addresses from a network address translation (NAT) table.

13. The non-transitory machine-readable medium method of claim 11, wherein the networking of the first and second containers is initially managed by a container service, wherein the configuring of the networking of the host and of the first and second containers includes:

disabling management of the networking of the first and second containers by the container service;

generate a plurality of networks for use by the first and second containers; and configuring the plurality of networks for use by the first and second containers to route incoming and outgoing traffic.

14. The non-transitory machine-readable medium of claim 11, where the configuring of the networking of the host and of the first and second containers includes configuring one or more incoming routes from the host to the first and second containers and configuring one or more outgoing routes from the first and second containers to the host.

* * * * *